Dec. 6, 1955 J. A. ROSEMAN, JR 2,725,703
GANG MOWER
Filed Aug. 12, 1953 3 Sheets-Sheet 1

INVENTOR.
Joseph A. Roseman, Jr.
BY Parker & Carter
ATTORNEYS

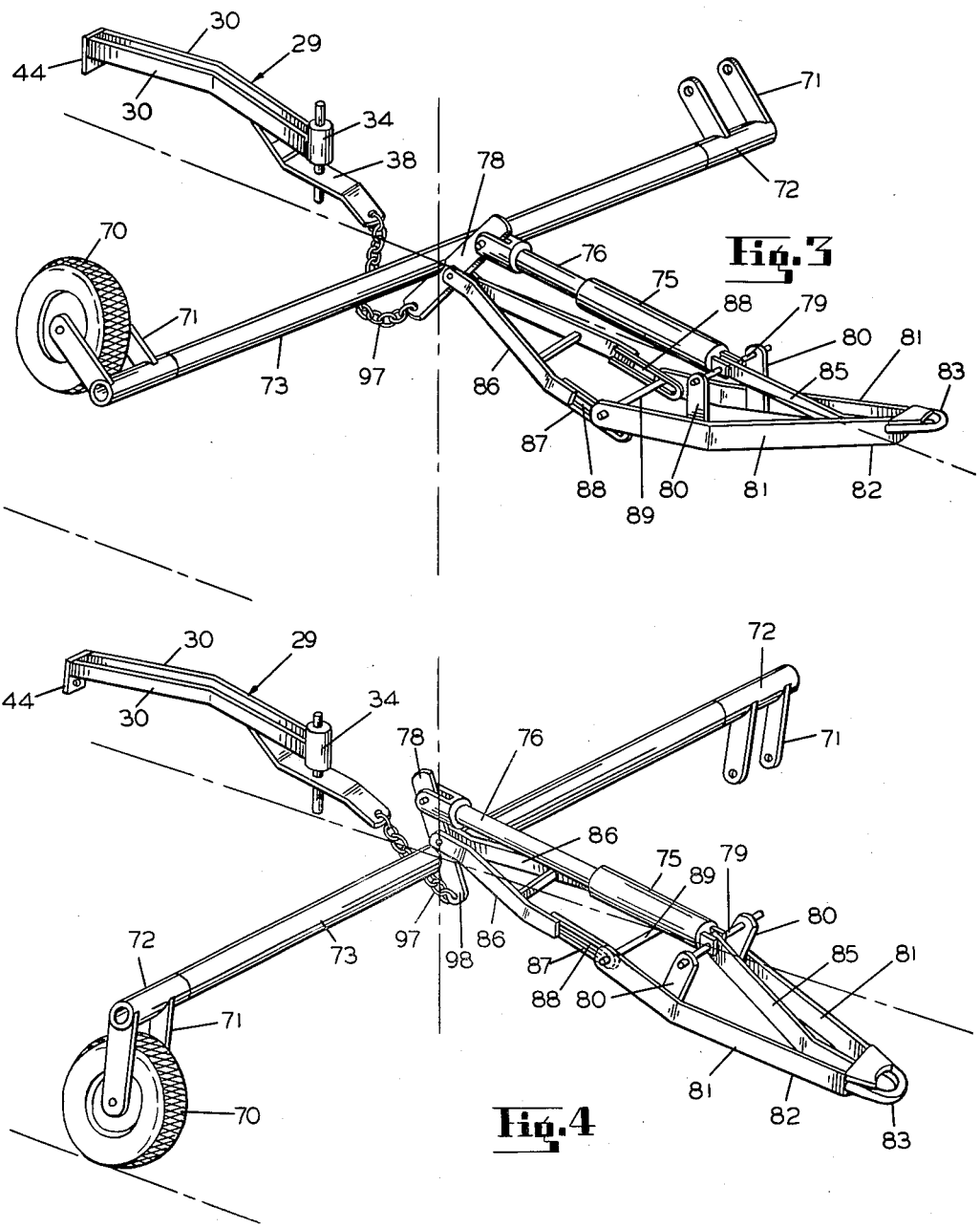

Dec. 6, 1955   J. A. ROSEMAN, JR   2,725,703
GANG MOWER
Filed Aug. 12, 1953   3 Sheets-Sheet 3
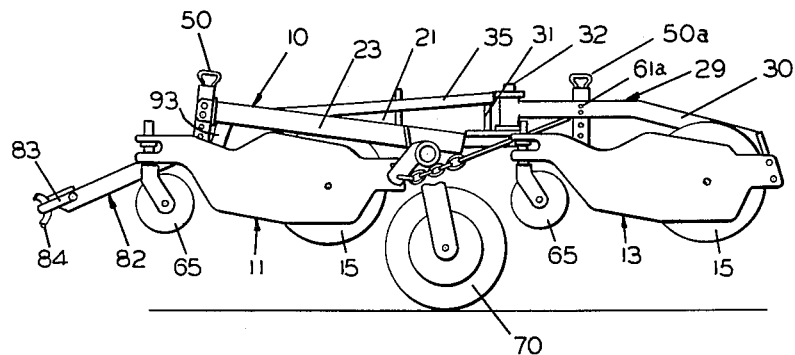
Fig. 5
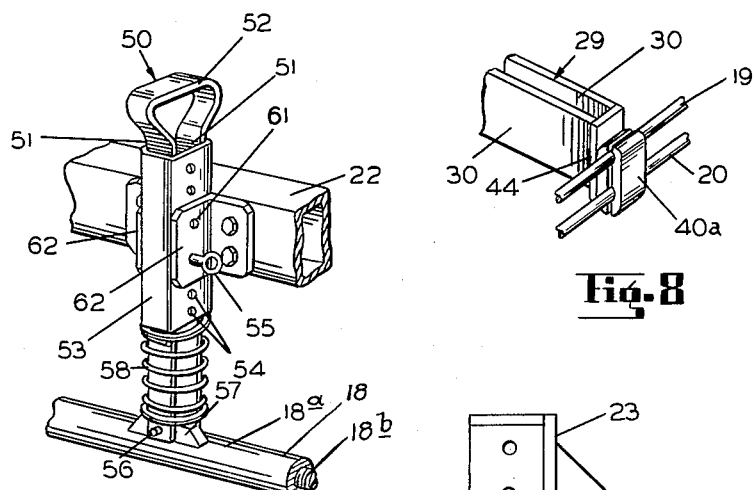
Fig. 7
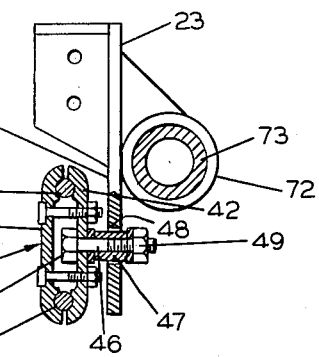
Fig. 8
Fig. 6
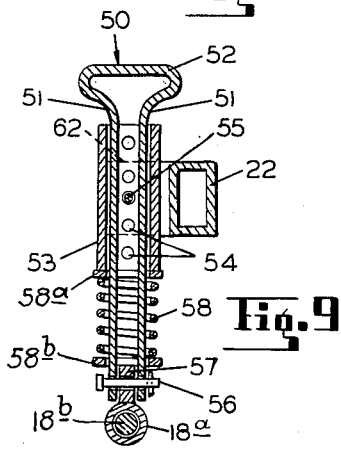
Fig. 9
INVENTOR.
Joseph A. Roseman, Jr
BY Parker & Carter
ATTORNEYS

United States Patent Office 2,725,703
Patented Dec. 6, 1955

2,725,703

GANG MOWER

Joseph A. Roseman, Jr., Morton Grove, Ill., assignor to Roseman Mower Corporation, Evanston, Ill., a corporation of Illinois Application August 12, 1953, Serial No. 373,845

8 Claims. (Cl. 56—7)

This invention relates to tractor-drawn gang mowers and the like wherein a plurality of mower units can be raised and held above the ground level during transportation of the main frame.

Among the objects of the invention is to provide a simple and efficient trailer frame for a plurality of mower units or like implements affording independent lateral tilting movement of the individual implements while the latter are in operative position relative to the ground, and also having an improved form of elevating linkage operable by power for raising the implements from the ground and holding them in elevated position.

A still further object of the invention is to provide an improved arrangement for adjusting the working height of the several implements with respect to the main frame during operation, while permitting flexibiilty of lateral tilting movement of all the implements and lateral swinging movement of a trailing unit forming part of the assembly.

Other objects and advantages of the invention will appear from time to time as the following description proceeds.

The invention may best be understood by reference to the accompanying drawings, in which:

Figure 3 is a detail fragmentary perspective view showing more or less diagrammatically the hydraulic elevating means for the gang frame with the elevating wheels shown in raised or non-transporting position;

Figure 4 is a view similar to Figure 3 but showing the elevating means in lowered or transporting position;

Figure 5 is a view similar to Figure 2 but showing the gang mower in elevated or transporting position;

Figure 6 is an enlarged detail vertical section taken through the pivotal support for the rear ends of each of the two front mower units;

Figure 7 is an enlarged detail perspective view of the adjusting handle for supporting the front ends of the two front mower units;

Figure 8 is a detail perspective view showing the supporting means for the rear end of the rear mower unit;

Figure 9 is a vertical section of the adjusting handle shown in Figure 7.

Figure 1:
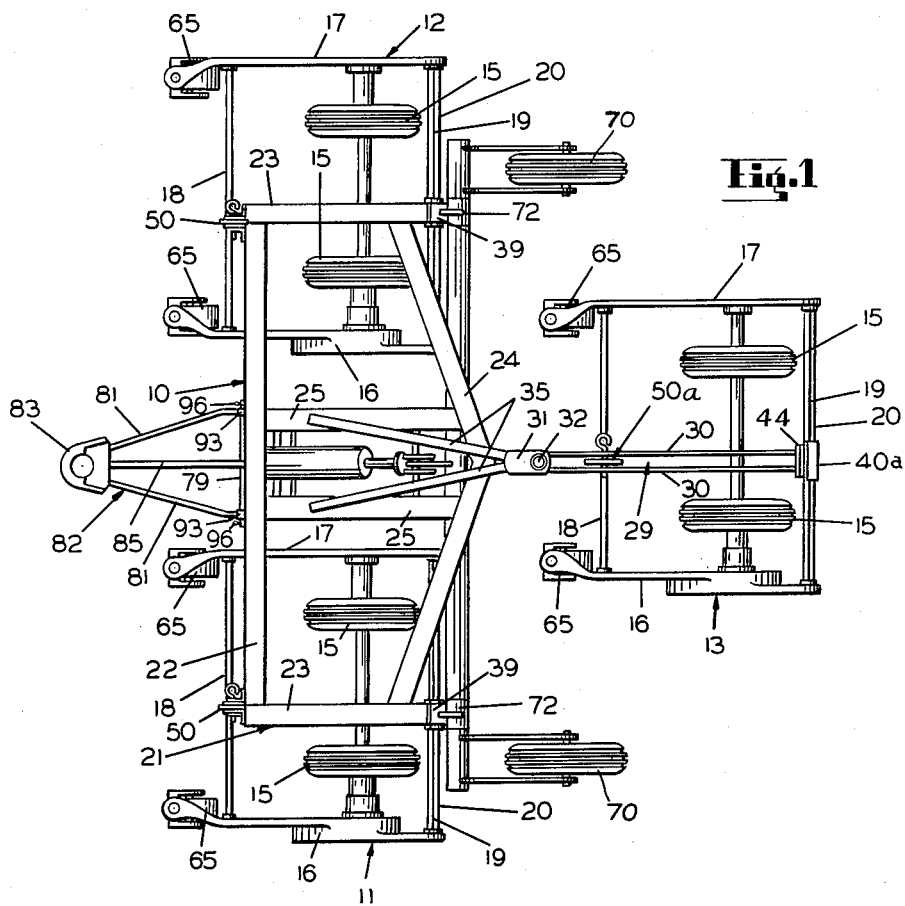
Figure 1 is a top plan view of a gang mower constructed in accordance with my invention.

Referring now to details of the embodiment of the invention illustrated in the drawings, a gang supporting frame, indicated generally at 10, is arranged to provide support for two mower units 11 and 12 of conventional cutting reel and bed-knife type, arranged in side-by-side relation to each other, to form a front cutting row, and a third mower unit 13 in trailing position. Each of the mower units includes a pair of ground wheels 15, 15 disposed near the rear of the unit, and adjacent opposite side frames 16 and 17. In the illustrative form shown herein, the ground wheels are rubber-tired and provide traction through suitable gearing, not shown, mounted in one of the side frames 16 for driving the rotary cutter or reel (not shown) disposed near the front of the unit in the usual manner. The two side frames 16 and 17 of each mower unit are connected together at their front ends by a cross bar indicated generally at 18 and at their rear ends by a pair of cross bars 19 and 20. Other details of the mower units need not be described herein as they form no part of the present invention.

The gang frame 10 includes a rigid front frame section 21 including front bar 22, parallel side bars 23, 23 and a rear cross bar 24 having its outer ends fixed near the rear ends of the side bars 23 and projecting rearwardly in a wide V-shaped form, with the apex of the V disposed centrally of said frame. The frame members just mentioned are all in substantially the same horizontal plane. A pair of longitudinal parallel struts 25, 25 connect the opposite legs of the V-shaped rear bar member with the front bar member. The front frame portion 21 just described is of sufficient width to extend laterally for approximately one-half the width of the two front mower units 11, 12 when they are assembled beneath said frame.

A trailing support 29 forming part of the main frame consists of two spaced parallel bars 30, 30 connected pivotally at their front ends, to the front frame section 21 adjacent the apex of the V-shaped rear cross bar 24 and having their rear portions arched downwardly to an upright plate 44 having pivotal connection with the two rear cross bars 19 and 20 of the rear or trailing mower unit 13, in a manner to be presently described in greater detail.

In the form shown, the pivotal connection of the trailing support 29 to the front frame section 21 consists of a C-shaped bracket 31 fixed in an upright position at the apex of the rear cross bar 24, and supporting an upright pivot pin 32 passing through an upright bearing 34 fixed to the parallel members 30, 30 of trailing support 29. A pair of supports forming a V 35, 35 are connected to the upper end of the C-shaped bracket 31 and extend forwardly at a downwardly inclined angle to the two struts 25, 25 near the front of the frame 21. The trailing support 29 also has a forwardly projecting tongue or lever arm 38 fixed as by welding to the bottom of bar 29 and projecting forwardly a substantial distance forwardly of the axis of said pivot bearing and below the latter. The purpose of this tongue will presently be described.

As shown in Figure 6, each side bar 23 has a depending bracket 39 at its rear end to which a clamping bracket 40 is pivotally connected, carried on the rear cross bars 19 and 20 of each front mower unit 11 or 12. In the form shown herein, the clamping bracket 40 consists of two plates 41 and 42 secured together as by bolting and having their upper and lower edges clamped over the upper and lower cross bars 19 and 20 of the mower unit. A pivoting bolt 43 has its head secured between the plates 41 and 42 and has shank 46 projecting rearwardly through the rear plate 42, a spacing collar 47 and an aperture 48 in the bracket 39. A nut 49 is threaded on the rear end of said bolt. The spacing collar 47 has sufficient clearance and looseness within the aperture 48 to permit the rear end of each mower unit to swivel laterally on the axis of pivot bolt 43, as well as to permit the front end of the mower unit to be swung upwardly or downwardly for the adjustment of the cutting height thereof.

As shown in Figures 7 and 9 the front end of each front mower unit is connected to the front bar 22 of the gang frame by an adjusting handle 50 supported by forwardly extending bars of projecting angle plates 62, 62. The adjusting handle 50 is made of a single length of strap metal bent to form two parallel spaced legs 51, 51 connected by a widened and flattened upper end portion 52 to provide a handle for the device. The two parallel legs are slidably mounted in a hollow elongated tube 53 generally rectangular in cross section. Said tube has a series of registering holes 54, 54 spaced longitudinally thereof in opposite side walls for reception of an adjusting pin 55, so that said adjusting pin passes between the legs 51, 51 of the adjusting handle. The lower ends of the legs 51, 51 extend a substantial distance below the hollow tube and are connected by a pivot pin 56 to an upstanding bracket 57 formed integral with a tube 18a, which forms part of the front cross bar 18 of the mower unit.

A tie bar 18b passes through the tube 18a and is suitably fixed at opposite ends of the side frames 16 and 17. The outer tube 18a is thus freely swingable on a horizontal axis to permit tilting adjustment of the front end of the mower unit relative to the adjusting handle 50.

The rear mower unit 13 is similarly mounted on the trailing support 29 for both lateral swinging and vertical swinging movements relative to said trailing support, as shown in Figure 8, excepting that the clamping bracket 40a, which corresponds to the clamping bracket 40 connected to the front mower units 11 and 12, is reversed and a pivot bolt and collar (not shown), corresponding to pivot bolt 43 and collar 47 extend in a forward direction and pass loosely through the upright plate 44 fixed to the rear end of the trailer support 29.

The front end of the rear mower unit 13 is connected to the trailing support 29 by an upstanding adjustment handle 50a similar in construction and operation to the adjusting handle 50. The rear adjusting handle 50a, however, is guided between the spaced guide bars 30, 30 of the trailing bar 29 and its adjusting pin is passed through opposed holes 61a, 61a in said side bars to adjust the front end of the rear mower unit to proper cutting height.

It will also be noted that the pivot pin 56 connecting the adjusting handle 50 to the front cross bar 18 of each mower unit is generally in horizontal alignment with the point of pivotal connection of the depending bracket 39 to the rear cross bars 19 and 20 of each front mower unit. This provides two swivelling supports connecting the front and rear ends of each mower unit to the gang frame, and permits independent lateral swinging movement of these mower units relative to the gang frame 10 about axes extending in the direction of the forward movement of the mower units while cutting.

As will be seen from the several figures, the two points of pivotal connection to the front and rear cross bars of each mower unit are disposed in slightly offset relation toward one side of the mower unit, for the reason that the several mower units have their geared connection from their traction wheels to the cutter reel, disposed in the side frame 16 at one side of the unit. In order to overcome the lateral unbalancing effect caused by the greater weight of the gearing just described, the front and rear swivelling supports for the mower units are located in that slightly offset position at which the mower unit will normally be drawn in a straight line with respect to the mower frame while on the ground, and also suspended in substantially lateral balanced position while in elevated position off the ground.

In the form shown in the drawings, the mower units 11, 12 and 13 may have conventional caster wheels 65 mounted at the front ends of their side frames, as is often the case with mower units of this general type. When used with a supporting gang member however, these caster wheels will seldom, if ever, be lowered sufficiently to engage the ground, but are used primarily to guard the front end of their respective mower units, and particularly the blade knife and cutter reel thereof, from damage in case they should come into contact with a solid obstruction, such as a concrete curbing or the like while the mower unit is in operation.

Figure 2:
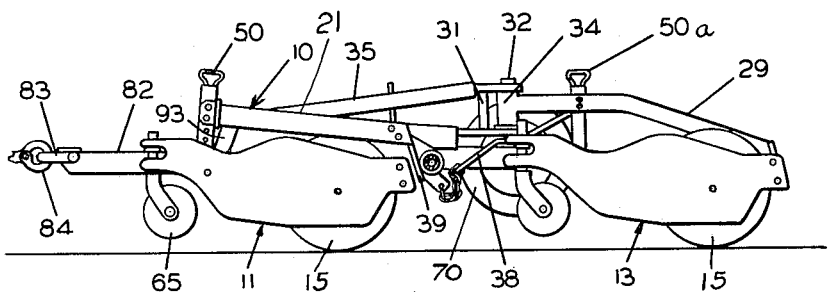
Figure 2 is a side view of the gang mower shown in Figure 1, with the mower units lowered in mowing position but with the elevating wheel on the near side of the gang mower omitted for clarity of illustration.

Referring now to the means for elevating the gang frame to raise the several mower units into transporting positions substantially above the ground, a pair of elevating wheels 70, 70 herein consisting of rubber-tired wheels of substantially the same diameter as the ground wheels 15, 15 of each of the mower units, are rotatably supported on the ends of forked arms 71, 71 having their opposite ends fixed to sleeves 72, 72 which, in turn, are fixed on the outer ends of a transverse rocking shaft 73. The rocking shaft is journalled in rearwardly extending brackets 39, 39 fixed to the rear ends of the side bars 23, 23 of the rigid frame section 21. The arrangement is such that the elevating wheels 70 are disposed for limited vertical swinging movement at opposite sides of the main frame, either to a raised position spaced substantially above the ground surface, as shown in Figure 2, or to a lowered transporting position as shown in Figure 5, wherein the entire gang frame is raised to lift the several mower units therewith.

The trailing bar 29, which supports the rear mower unit 13, will be raised or lowered bodily with the gang frame, by reason of its pivotal connection on an upright axis to the front frame section 21 of the gang frame.

The elevating wheels 70 are operated by power means herein consisting of a hydraulic cylinder 75 disposed centrally of the front rigid frame section 21 between the longitudinally extending struts 25, 25. The hydraulic cylinder 75 may be of the double-acting type, actuated as usual from a source of hydraulic pressure under reversible control means of any well-known form.

The piston rod 76 in cylinder 75 is pivotally connected at its rear end to the upper end of a lever 78 fixed on the rocking shaft 73. The front end of the cylinder 75 is pivotally connected to a pintle 79 passing through a pair of upstanding arms 80, 80 formed integrally with a pair of diverging arms 81, 81 of a hitching tongue or draft bar, indicated generally at 82. Said hitching tongue has an eye 83 fixed to its front end for attachment to a suitable trailer hitch 84 (see Figures 2 and 5). Said pintle 79 has a link 85 pivoted thereon and extending forwardly at an inclined angle to the eye 83. The rear ends of the arms 81, 81 are connected to a toggle link, indicated generally at 86, having spaced forwardly projecting side arms 87, 87 at its front end with longitudinal slots 88, 88 through which a pintle 89 is passed. The outer end of said pintle 89 is pivotally connected to the rear ends of the arms 81, 81 of the hitching tongue 83. The purpose of the slots 88, 88 will presently be described.

The side arms 87, 87 of toggle link 86 converge rearwardly and are pivotally connected at their rear ends to the lever 78 intermediate the shaft 73 and the pivotal connection of the piston rod 76 at the outer end of said lever.

The elevating linkage just described is connected to the main frame by the pintle 79, the outer ends of which are pivoted in a pair of downwardly extending arms 93 fixed to the struts 25, 25 of the main frame. Cotter pins 96 pass through the outer ends of said pintle.

The use and operation of the apparatus is as follows:

Referring first to what may be termed a normal operative or cutting position of the mower units shown in Figure 2 of the drawings, it will be observed that the mower units are both supported on their ground wheels 15, while the hitching tongue 82 is connected to the trailer hitch 84 of the tractor with said tongue disposed in a generally horizontal position. The elevating wheels 70 are in raised position and the elevating linkage is in a condition substantially as shown in Figure 3.

It should be especially noted that in the cutting position shown in Figure 3, the pintle 89 at the rear end of the tongue 81 is at a point intermediate the ends of the slots 88 at the front end of the toggle link 86. This permits the front end of the hitching tongue 82 to swing freely a limited distance in a vertical direction about the pintle 79 which pivotally connects the hitching tongue to the front section 21 of the main frame 10. Thus the front end of the hitching tongue 82 is free to be moved up and down to accommodate itself to the various heights assumed by the trailer hitch 84 relative to the gang frame as the tractor and gang travel over rolling ground.

When the mower units are on the ground, as shown in Figure 2, the main frame 10 including the front frame section 21 and the trailing support 29 are supported wholly by the ground wheels 15, 15 of the front and rear rows of mower units. It will be noted further that due to pivotal connection of the trailer support 29 to the front frame section 21 on an upright axis the trailing support 29 and the rear mower unit 13 form in effect a counterbalance for the portion of the front frame section 21 as well as the forward ends of the front mower units 11 and 12 which project forwardly of the transverse axes of the ground wheels 15 of said front mower units. The specific manner in which the cutting height of the front mower units is controlled by handles 50 will presently be described.

Assuming that the apparatus is in normal cutting position, shown in Figure 2, with the ground wheels of the several mower units in supporting position on the ground, it will be understood that the front mower units 11 and 12 are free to swing laterally on substantially parallel axes extending in the direction of forward movement of the assembly. Each of these axes is defined by the pivot pin 56 which connects the lower end of the adjusting handle 50 with the front cross bar 18 of the unit, and the pivot pin 46 on clamp 40 which connects the bracket 39 on front frame section 21 to the rear cross bars 19 and 20 of said mower unit. Similarly, the rear mower unit 13 is free for lateral swinging movement about the longitudinal axes defined by its pivotal connection at the front end of said unit with the lower end of its adjusting handle 50 and the pivotal connection at the rear end of said unit with the clamp 40a at the rear end of the trailing support 29.

The cutting height of each mower unit is controlled by its adjusting handle 50 in the following manner:

The tube 53 associated with each handle is adjusted vertically of its supporting means on the main frame by inserting the adjusting pin 55 in the proper pair of holes, with the handle portion 52 engaging the upper end of tube 53, so that the front end of the mower unit will be supported at the desired cutting height. The coil spring 58 surrounding the lower ends of the legs 51, 51 of the handle will permit yielding upward movement of the handle relative to the tube 53 in case the cutter reel or bed plate of the cutting unit should strike an obstruction. At all other times, the front end of the mower unit is suspended from the main frame by the adjusting handle, with the coil spring 58 under moderate, if any, compression.

As has been previously explained, the swivel support for the rear end of each of the mower units is loosely connected to its respective supporting bracket on the frame so as to permit limited vertical movement of the front end of each mower unit. As will also be seen in Fig. 9 the rectangular tube 53 of the adjustment handle 50 is spaced forwardly from the main frame member 22, and the horizontal tube 18a is rotatably mounted on the tie bar 18b so as to afford the desired freedom for this vertical movement of the front mower units.

When it is desired to elevate the gang frame and mower units relative to the ground the hydraulic cylinder 75 is actuated to extend the piston rod 76 causing the lever 78 on the rocking shaft 73 to be moved rearwardly through a sufficient arc to swing the two elevating wheels 70 downwardly into supporting relation with the ground, as shown in Figs. 4 and 5. It will be observed that at a point intermediate the fully raised position of the elevating wheels 70 shown in Figure 3 and the fully lowered position shown in Figure 4, that the pintle 89 will be moved to the front end of the slots 88, 88 on toggle link 86. At this point further extension of the piston rod 76 will take up all the lost motion in the hitching tongue thus afforded by pintle 89 in slots 88 so that further movement of pintle 89 will cause the front end of the hitching tongue 82 to be positively depressed with respect to the gang frame. As a result when the elevating wheels 70 of the gang frame are in fully lowered position shown in Figures 4 and 5 the hitching tongue 82 will be depressed into a forwardly and downwardly inclined position with respect to the gang frame and cause a corresponding elevation of the front end of the main frame 10 to maintain said main frame in a generally horizontal position relative to the ground, because of the connection of the tongue to the trailer hitch 84 of the tractor, as indicated in Figure 5.

In order to restrain the lateral swinging movement of the rear mower unit 13 while it is held in suspended position off the ground by the laterally swinging trailer support 29, a short length of chain 97 is connected between the front end of the forwardly projecting tongue 38 which is fixed to the bottom of the support 29 as previously described, and the lever arm 98 fixed on the transverse rocking shaft 73. In the form shown herein the lever arm 98 is an extension of the lever 78 and extends downwardly from the shaft 73 so that when said shaft is in position in which the elevating wheels are raised from the ground and the mower units are in cutting position on the ground, the chain 97 will be sufficiently loose to permit the desired amount of lateral swinging movement of the trailing support 29 relative to the front frame section 21. When the shaft 73 is rotated to the position in which the elevating wheels are lowered into transporting position, however, the chain 97 will be drawn downwardly and forwardly into a taut condition to hold the trailing support 29 against lateral swinging movement.

Although I have shown and described my invention as applied to lawn mower units, it will be understood that it can also be applied to several other types of multiple or gang implements, such as disc harrows, or the like. Moreover, I do not wish to be limited to the exact construction shown and described, but that various changes and modifications may be made therein without departing from the spirit and scope of the invention as defined in the appended claims.

I claim:

1. In a gang mower including a plurality of mower units having ground wheels for supporting the units on the ground, a generally horizontal main gang frame having a pair of laterally spaced elevating wheels thereon vertically movable for elevating the frame relative to the ground, a hitching tongue pivotally connected to the front of said frame for vertical swinging movement on an axis generally transverse to the normal direction of movement of said frame, and power means on said frame for simultaneously lowering the front end of said hitching tongue and said elevating wheels toward the ground to cause bodily elevation of the frame in a generally horizontal plane, the combination of supporting connections between each of said mower units and said main frame comprising two horizontally spaced swivelling supports for permitting independent lateral swinging movement of said units relative to said frame, said swivelling supports being disposed adjacent the front and rear ends of each of said mower units on a generally horizontal axis extending in the normal direction of movement of the gang frame and substantially in balancing relation with opposite sides of said units, whereby said mower units may be elevated by said frame into laterally balanced transporting position above the ground.

2. A gang mower structure in accordance with claim 1, wherein the swivelling support for the rear end of each mower unit includes means for limited vertical swinging movement of the front end of said unit relative to the gang frame, and means is provided for vertically adjusting the swivelling support for the front end of each of said mower units relative to the gang frame to control the cutting height of said unit.

3. A gang mower structure in accordance with claim 1, wherein the main gang frame is provided with a trailing support arm pivotally connected to the main frame on a vertical axis, and the last-named mower unit is connected to said trailing arm by the same form of laterally-balanced swivelling supports mentioned for connecting the first-named mower units on the main frame.

4. In a gang mower including a plurality of mower units having ground wheels for supporting the units on the ground, a generally horizontal gang frame connecting said units for operation as a gang, the connections between said units and said frame including horizontally spaced swivelling supports at the front and rear and intermediate the sides of each of said units for affording independent substantially laterally balanced swinging movement of said units relative to said frame, a pair of elevating wheels vertically movable on said frame, a draft bar pivotally connected to said frame for vertical adjustment on an axis generally transverse to the direction of movement of the gang frame, and power means on said frame including hydraulic cylinder and piston means interconnecting said draft bar with said vertically movable elevating wheels for simultaneously lowering said elevating wheels and the front end of said draft bar to cause bodily elevation of the frame and said mower units into transporting position above the ground, with said units supported from said frame at their front and rear ends in substantially horizontal laterally-balanced relation to the ground.

5. In a gang mower, a generally horizontal main gang frame having a pair of laterally spaced elevating wheels vertically movable thereon, at least a pair of mower units having ground wheels for supporting the units on the ground and connected to said main frame in side-by-side relation for supporting the latter when its elevating wheels are in raised non-ground-engaging position, a trailing support arm pivotally connected to the main frame on a vertical axis, a mower unit having ground wheels for supporting said unit on the ground, and connected to said trailing support arm, a lever arm rigid with said trailing support arm and extending forwardly therefrom in alignment with its vertical axis, power means on said main frame for depressing its elevating wheels into engagement with the ground to raise said mower units bodily from the ground, a single flexible connection on the front end of said rigid lever arm having its forward end operatively connected with said power means, said flexible connection being normally loose to afford relative freedom of lateral swivelling movement of said trailing support when the frame is supported by said mower units, but arranged to be drawn taut when the elevating wheels are lowered into ground-supporting position, to limit lateral swivelling movement of said trailing support and the mower unit connected thereto when the frame is in elevated position to suspend the mower units above the ground.

6. In a tractor drawn gang assembly having a plurality of implement units each having ground-supporting wheels, a generally horizontal main gang frame having said implement units flexibly connected thereto so that said frame is wholly supported on the ground-supporting wheels of said implement units when said implement units are in operative position on the ground, said main frame having a transverse shaft pivoted adjacent the rear end of said gang frame, a pair of laterally spaced arms on said shaft having elevating wheels rotatable on their outer ends, a tongue pivotally connected to said gang frame on a vertically offset transverse axis, the front end of said tongue being adapted for hitching to a tractor, an upstanding lever arm fixed on said transverse shaft, means pivotally connected to the said lever arm for rocking said transverse shaft by power for positively elevating the rear end of said gang frame relative to the ground, and a toggle link pivotally connecting said lever arm with said hitching tongue to cause the front end of said tongue to be depressed when said transverse shaft is rocked into position to swing the elevating wheels into elevating position relative to the ground, whereby the gang frame will be bodily raised, together with the implement units and their ground-supporting wheels, from operative position on the ground, and with the front end of the assembly partially supported by the hitching tongue and its connection with the tractor.

7. A construction in accordance with claim 6, wherein the connections between the toggle link and said hitching tongue include a lost-motion device effective when said main frame is lowered for support on the ground-supporting wheels of said implement units, to permit relatively free vertical swinging movement of said hitching tongue relative to said frame, whereby the front end of the main frame is unaffected by relative changes of elevation of the tractor hitch when the assembly is traveling over uneven ground.

8. A construction in accordance with claim 2, wherein the supporting connections between the main frame and the front end of each of the implement units include vertical adjusting means each comprising a pivotal support adapted for connection to the main frame in variable vertical positions, an elongated suspension member telescopically mounted on said pivotal support having an enlarged handle at its upper end, stop means on said suspension member having engagement with the upper end of said pivotal support, the lower end of said suspension member having universal pivotal connection with the front end of the implement unit, and compression spring means interposed between said universal connection and said pivotal support to permit upward yielding movement of the elongated suspension member and the front end of the implement unit relative to the main frame.

References Cited in the file of this patent
UNITED STATES PATENTS

| | | |
|---|---|---|
| 2,229,372 | Debnam | Jan. 21, 1941 |
| 2,525,047 | Sawtelle et al. | Oct. 10, 1950 |
| 2,623,341 | Evans et al. | Dec. 30, 1952 |
| 2,653,437 | Crump | Sept. 29, 1953 |
| 2,667,724 | Johnson et al. | Feb. 2, 1954 |
| 2,669,818 | Pursche | Feb. 23, 1954 |